US008965334B2

(12) United States Patent
Bu et al.

(10) Patent No.: US 8,965,334 B2
(45) Date of Patent: Feb. 24, 2015

(54) METHODS AND DEVICES FOR DEFENDING A 3G WIRELESS NETWORK AGAINST MALICIOUS ATTACKS

(75) Inventors: Tian Bu, Edison, NJ (US); Samphel Norden, West Orange, NJ (US); Thomas Y. Woo, Short Hills, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1646 days.

(21) Appl. No.: 11/303,915

(22) Filed: Dec. 19, 2005

(65) Prior Publication Data

US 2007/0143769 A1 Jun. 21, 2007

(51) Int. Cl.
| | | |
|---|---|---|
| *H04M 1/66* | (2006.01) | |
| *H04L 29/06* | (2006.01) | |
| *H04W 12/12* | (2009.01) | |
| *H04W 8/22* | (2009.01) | |
| *H04W 24/00* | (2009.01) | |
| *H04W 84/04* | (2009.01) | |

(52) U.S. Cl.
CPC ........ *H04L 63/1408* (2013.01); *H04L 63/1458* (2013.01); *H04W 12/12* (2013.01); *H04W 8/22* (2013.01); *H04W 24/00* (2013.01); *H04W 84/04* (2013.01)
USPC ...................... 455/410; 455/404.1; 455/414.1

(58) Field of Classification Search
USPC .......... 455/404.1, 456.3, 414.1, 550.1, 426.2, 455/563, 539.1, 461, 228, 519, 412.1, 466; 719/313
See application file for complete search history.

(56) References Cited

U.S. PATENT DOCUMENTS

| | | | | |
|---|---|---|---|---|
| 5,892,794 | A * | 4/1999 | Slegers | 375/219 |
| 7,092,357 | B1 * | 8/2006 | Ye | 370/230 |
| 2003/0115364 | A1 * | 6/2003 | Shu et al. | 709/246 |
| 2003/0135762 | A1 * | 7/2003 | Macaulay | 713/201 |
| 2003/0217283 | A1 | 11/2003 | Hrastar et al. | |
| 2004/0255157 | A1 | 12/2004 | Ghanea-Hercock | |
| 2005/0037733 | A1 * | 2/2005 | Coleman et al. | 455/411 |
| 2005/0086500 | A1 | 4/2005 | Albornoz | |
| 2005/0289649 | A1 | 12/2005 | Mitomo et al. | |
| 2006/0046761 | A1 * | 3/2006 | Bishop et al. | 455/519 |
| 2006/0068761 | A1 * | 3/2006 | Chambers et al. | 455/412.1 |
| 2006/0229022 | A1 | 10/2006 | Bu et al. | |
| 2006/0230450 | A1 * | 10/2006 | Bu et al. | 726/22 |
| 2007/0010248 | A1 * | 1/2007 | Dravida et al. | 455/435.1 |
| 2008/0043686 | A1 * | 2/2008 | Sperti et al. | 370/338 |

FOREIGN PATENT DOCUMENTS

| | | |
|---|---|---|
| CN | 1422039 A | 6/2003 |
| JP | 2000341749 A | 12/2000 |
| JP | 2003298763 A | 10/2003 |
| JP | 2005341217 A | 12/2005 |

(Continued)

OTHER PUBLICATIONS

[PIX], *Cisco PIX*, http://www.cisco.com, Cisco Networks Inc., web page.

(Continued)

*Primary Examiner* — Mazda Sabouri
(74) *Attorney, Agent, or Firm* — Capital Patent & Trademark Law Firm, PLLC

(57) ABSTRACT

Wireless state information collected or inferred from a 3G wireless network is used to detect and prevent malicious attacks against the network.

14 Claims, 1 Drawing Sheet

(56) References Cited

FOREIGN PATENT DOCUMENTS

| WO | WO0233870 | A2 | 4/2002 |
|---|---|---|---|
| WO | WO2005101766 | A2 | 10/2005 |
| WO | WO2006104752 | A1 | 10/2006 |

OTHER PUBLICATIONS

[Netscreen], *Netscreen ISG-2000*, http://www.juniper.net/products/integrated, Juniper Networks Inc., Oct. 2004.
[Ckpt], *Checkpoint Firewall-1*, http://www.checkpoint.com/products/protect/firewall-1.html, Checkpoint Technologies Inc., web page.
J. Ionnidis et al., *Implementing Pushback: Router-Based Defense Against DDoS Attacks*, Proc. of Network and Distributed Systems Security Symposium; Feb. 2002.
A. C. Snoeren et al., *Hash-Based IP Traceback*, Proc. of ACM SIGCOMM, 2001.
[Snort], *Snort: Open-Source Network Intrusion Detection System*, http://www.snort.org, web page.
[Bluetooth], http://www.bluetooth.com, web page.
[WiFi], *Wi-Fi Alliance*, http://www/wi-fi.org, web page.
[Umts], *Universal Mobile Telecommunication System*, http://www.3gpp.org, web page.
[CDMA2000], *Code Division Multiple Access*, http://www.3gpp2.org, web page.
[EVDO], *1x Evolution-Data Only*, http://www.3gpp2.org, web page.
D. Tang et al., *Analysis of a Metropolitan-Area Wireless Network*, Wireless Networks, vol. 8, No. 2, pp. 107-120, Mar. 2002.
[Snortsam], *Output Plug-in for Snort*, http://www.snortsam.net, web page.
[OPSEC], *Open Platform for Security Alliance*, http://www.opsec.com, web page.

\* cited by examiner

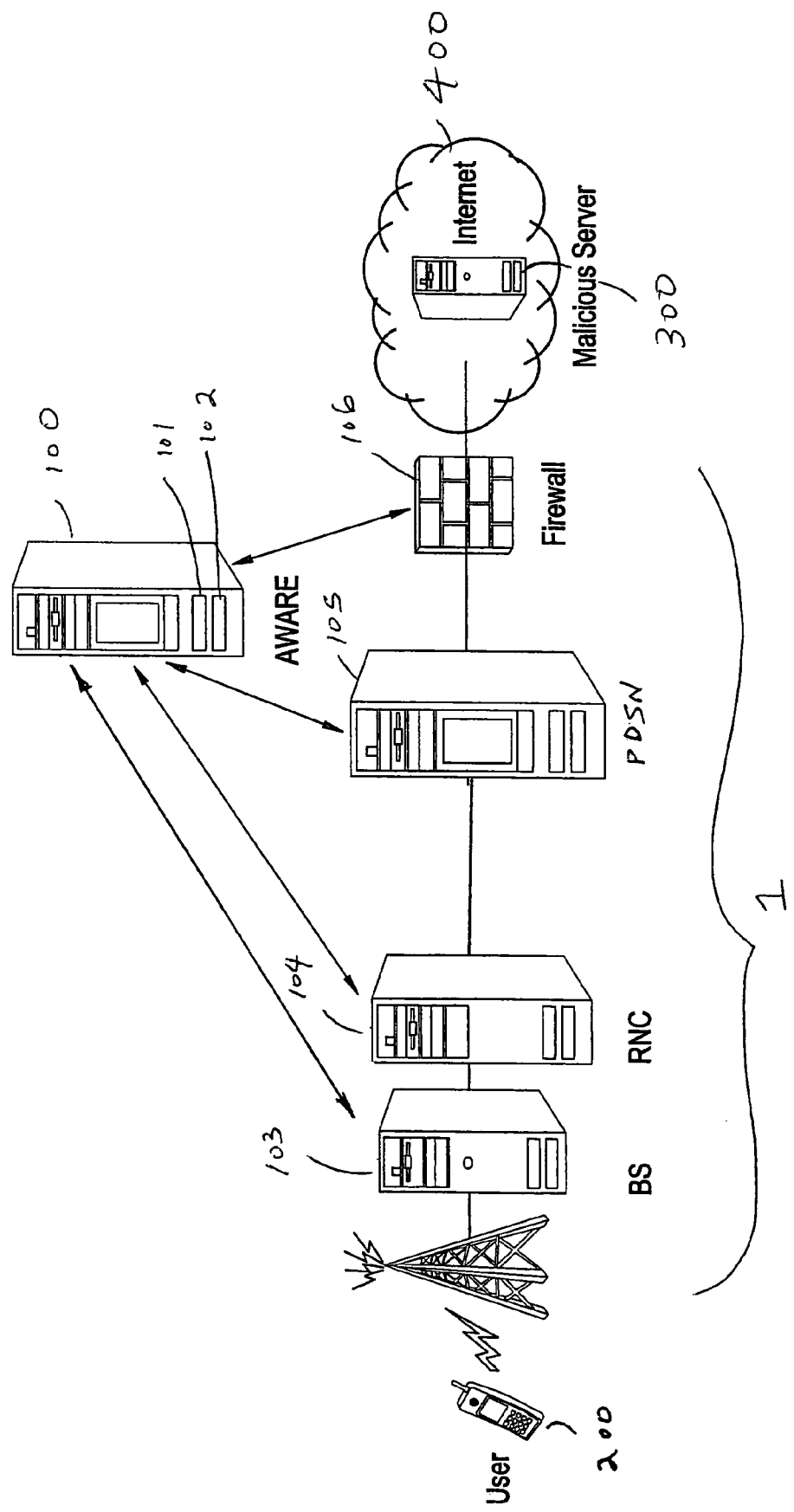

METHODS AND DEVICES FOR DEFENDING A 3G WIRELESS NETWORK AGAINST MALICIOUS ATTACKS

BACKGROUND OF THE INVENTION

The frequency and magnitude of malicious attacks against wireless networks have been steadily increasing.

A large variety of solutions have been proposed to counter malicious attacks against communication networks. While these schemes may mitigate the threat of attacks against wireline networks they are inadequate for wireless networks.

For example, in a wireline Denial of Service (DoS) attack it takes a long period of time, relatively speaking, for a server to be disabled because such machines have a larger processing capacity than a wireless endpoint (mobile) which has limited processing and battery lifetime. In addition, a wireless link is severely bandwidth-constrained when compared to a wireline network. Thus, if traffic from an attack reaches a mobile, the attack has already succeeded in wasting critical resources of the wireless link, the wireless infrastructure, and the battery power of the mobile. This is in contrast to typical wireline DoS attacks that must overwhelm processing resources at a server in order to succeed.

There are numerous types of attacks that are attempted against wireless networks, two of which are signaling type attacks and battery (i.e., sleep deprivation) attacks. Co-pending U.S. patent application Ser. Nos. 11/094,416 and 11/236,735, incorporated herein in full as if set forth in full herein discuss such attacks and propose specific techniques for defending against such attacks.

However, attacks against a 3G wireless network are not limited to just signaling and battery attacks.

It is desirable, therefore, to provide methods and devices for defending many types of 3G wireless networks against numerous types of attacks.

SUMMARY OF THE INVENTION

The present inventors have recognized that attacks against 3G wireless networks may be prevented, or substantially reduced, by making use of collected or inferred wireless state information.

More specifically, one embodiment (i.e., example) of the present invention provides for the detection of an attack against a 3G wireless network by obtaining wireless state information and comparing the obtained information to a profile to determine whether an attack is directed at an element in the network.

By using wireless state information the present inventors believe attacks can be more readily detected and prevented.

BRIEF DESCRIPTION OF THE DRAWINGS

FIG. 1 depicts an example of an architecture for defending a 3G wireless network against attacks according to one embodiment of the present invention.

DETAILED DESCRIPTION OF THE INVENTION, WITH EXAMPLES

To defend mobile devices in 3G wireless networks against numerous types of attacks, the present invention provides a novel architecture referred to as an architecture for Wireless Attack Resistance (AWARE).

FIG. 1 depicts one example of an AWARE architecture according to one embodiment of the invention.

In one embodiment of the present invention, an AWARE architecture (e.g., enabled device) 100 may comprise a learning database or profiler 101, and a detection engine or detector 102. The profiler 101 may be operable to collect wireless state information from the different elements of the wireless infrastructure 1 (e.g., network) including a base station (BS) 103, radio network controller (RNC) 104 and Packet Data Service Node PDSN, 105. In an alternative embodiment of the invention, the AWARE enabled device 100 may infer state information from its knowledge of the wireless network 1 when collection is not possible.

The profiler 101 is operable to capture and store information about a user 200, typically during a pre-processing step, in order to generate a traffic profile for a given user under normal (i.e., non-attack) conditions using, for example one or more statistical measures. In a further embodiment of the invention, after an initial profile is created the profiler 101 may update the profile regularly based on changes to a user's behavior. Information used in building the profile includes, but is not limited to, packet arrival times, IP addresses and port numbers of source(s), and destination(s). It should be understood that the profiler 101 may comprise one or more databases. These databases may communicate with other user databases and profilers for cross-mobile, cross RNC, or cross PDSN correlations. For example, data from multiple databases associated with one or more PDSNs may be aggregated and analyzed for similarities, for example. A similarity may indicate the onset or presence of an attack that spans multiple PDSNs.

One novel aspect of the profiling mechanisms provided by the present invention is the ability to correlate user, application, as well as server related profiles. By user profile, we refer to the statistics for an individual user. This division can be further categorized by individual application. For instance, web surfing is the most frequently used service by most users. Similarly, a video-on-demand server may use RTP packets to broadcast video to users. Statistics on an individual web server basis or any IP source can also be compiled by logging the arrival of HTTP/RTP packets.

To enable scalability, the profiler 101 may be operable to aggregate profiles across users with similar behaviors using, for example, the same metric. Aggregation allows profiles to be stored in a scalable manner so that it may, for example, be more easily correlated later on. For example, current traffic may be compared to an aggregated profile to detect inconsistencies. Aggregated profiles may also be maintained for popular servers and applications. The flexibility of using different classification approaches allows a more comprehensive and accurate characterization of what is considered as normal traffic.

Turning now to the detector 102, it is operable to detect a 3G wireless attack using one or more detection heuristics.

In slightly more detail, one example of a signaling cost which may be used is the signaling cost as traffic traverses through the wireless network 1. Malicious traffic may be identified because it introduces excessive signaling cost. The cost of signaling can be obtained in various ways depending on the cooperation that can be obtained from elements within the wireless network 1.

In one embodiment of the present invention, the detector 102 may be operable to compare a stored non-attack or normal profile with current traffic conditions to determine whether current traffic for a user or set of users 200 violates the normal profile.

Once an attack is detected and the attacker identified, the AWARE enabled device 100 may block all future traffic from the suspected attacker by, for example, re-configuring or configuring the firewall 106 (e.g., setting rules in the firewall).

As mentioned before, AWARE enabled devices provided by the present invention collect wireless specific state information including the setup and release of wireless data channels, and the time that a mobile is active. The inventors know of no other device as of this date that collects wireless state information and uses it to detect 3G wireless attacks in a manner akin to the present invention.

In further embodiments of the present invention, the AWARE-enabled device 100 may be operable to maintain information at different levels of granularity (for the same measurement parameter). Said another way, for the same measurement parameter, different aggregation levels may be used. For example, a per-mobile, per-RNC, per-BS, per-PDSN or per-external-source basis. This allows the detection heuristic to find anomalies at multiple levels, preventing an attacker from spreading malicious traffic across different RNCs or launching an attack that doesn't limit itself to a particular BS.

In accordance with the present invention, the location of an AWARE-enabled device may be varied.

For example, an AWARE-enabled device may be co-located with a firewall 106 of a wireless service provider. If such a design is chosen then it may not be necessarily assumed that any other part of the wireless network 1 has knowledge of the presence of the AWARE-enabled device 100 or interacts with the AWARE-enabled device 100.

In a further embodiment of the present invention, the profiler 101 of such a co-located AWARE-enabled device 100 may use IP layer information, such as packet arrivals and information from IP/TCP and application layer headers, to build profiles. This assumes that the AWARE-enabled device 100 can look inside a packet. If an IPsec (tunnel mode) has been enabled, the AWARE-enabled device 100 may be co-located with an IPsec gateway in the domain so as to be able to decrypt and inspect packet headers and payloads.

In a "least-invasive" design, the AWARE-enabled device 100 looks at IP packets that are passed on from the firewall 106 before they reach the PDSN 105. All of the necessary information is contained in the TCP and IP headers and the payload itself. Information needed by the profiler 101 to build a profile can be extracted from the above headers and payload.

If a AWARE-enabled device is not co-located with an IPsec gateway, there needs to be a so-called security association with the gateway so it can decrypt and process ESP-encapsulated packets in a tunnel mode.

If an AWARE-enabled device is not co-located with a firewall, an interface may be used to communicate with most commercial firewalls, such as Checkpoint's Firewall-1, so that an AWARE-enabled device may configure the firewall's filters, etc.

In an alternative embodiment of the present invention, an AWARE-enabled device 100 may operate between a PDSN 105 and an RNC 104. In such a design, the device may interact with the PDSN 105 to obtain information as to how packets are distributed to different RNC's.

In addition, when an AWARE-enabled device operates between a PDSN and RNC more user-specific state information may be gathered. This provides finer grain information, such as: the number of signaling events for a FCH & SCH setup/release, the timestamp(s) of signaling messages, and power control information via a base station that estimates mobile power consumption. An AWARE-enabled device may also be able to obtain mobility related information because a mobile may cross over from one RNC to another. The impact of mobility information on the detection heuristic is worth analyzing, because highly mobile end-users can contribute significantly to the load of an network. Launching a wireless DoS attack, for example, against highly mobile users requires additional tasks, such as more frequent paging, that can add substantially to processing overhead. Also, a mobile may initiate a PPP connection with the PDSN before initiating a transfer. An AWARE-enabled device may also query the PDSN to obtain a PPP state history.

An AWARE-enabled device can also query an RNC for channel setup events as well as power control messages that are sent to the mobile to indicate at what power the mobile should transmit the data.

AWARE-compatible interfaces may also be provided by the present invention. In further embodiments of the present invention, AWARE-compatible interfaces are provided to allow an AWARE-enabled device, for example, to query wireless user/mobile state(s). Such an interface may also allow an AWARE-enabled device (or devices) to communicate in a secure manner with elements of a wireless network in order to obtain mobile/user-specific information.

It should be understood that the methods of the present invention, the AWARE-enabled devices, interfaces, and any subcomponents (e.g., learning database, profiler, detector, etc.) may be realized in hardware, software, firmware or some combination of the three. For example, one or more programmable or programmed controllers, processors, or computer readable mediums, separately or in combination, may be operable to store one or more instructions, programs or code (and data) that, in turn, is operable to carry out the features and functions of the present invention described above and in the claims that follow.

We claim:

1. A method for detecting an attack against a wireless network comprising:
    generating a profile based on non-attack, wireless traffic conditions;
    obtaining wireless state information comprising wireless data channel set-up and release information, the time that a mobile device is active and application based information from at least a radio network controller, wherein the application based information is categorized based on the type of multimedia service it provides to a user of the mobile device; and
    comparing the obtained information to the profile to determine whether an attack is directed at an element in the wireless network.

2. The method as in claim 1 further comprising preventing malicious traffic intended for a mobile device in the network from reaching the device when the comparison indicates an attack.

3. The method as in claim 1 wherein the state information is collected from one or more network elements in the network.

4. The method as in claim 1 wherein the state information is inferred from knowledge of the network.

5. A device for detecting an attack against a wireless network operable to:
    generate a profile based on non-attack, wireless traffic conditions;
    obtain wireless state information comprising wireless data channel set-up and release information, the time that a mobile device is active and application based information from at least a radio network controller, wherein the application based information is categorized based on the type of multimedia service it provides to a user of the mobile device; and compare the obtained information to the profile to determine whether an attack is directed at an element in the wireless network.

6. The device as in claim 5 further operable to prevent malicious traffic intended for a mobile device in the network from reaching the device when the comparison indicates an attack.

7. The device as in claim 5 wherein the device is further operable to collect the state information from one or more elements in the network.

8. The device as in claim 5 wherein the device is further operable to infer state information from knowledge of the network.

9. The method as in claim 1 wherein the wireless state information further comprises time-based mobility activity information.

10. The method as in claim 1 wherein the wireless state information further comprises IP layer information.

11. The method as in claim 10 wherein the IP layer information comprises packet arrivals and information from IP/TCP application layer headers.

12. The device as in claim 5 wherein the wireless state information further comprises time-based mobility activity information.

13. The device as in claim 5 wherein the wireless state information further comprises IP layer information.

14. The device as in claim 13 wherein the IP layer information comprises packet arrivals and information from IP/TCP application layer headers.

* * * * *